(12) United States Patent
Deo et al.

(10) Patent No.: US 8,335,592 B2
(45) Date of Patent: *Dec. 18, 2012

(54) BEVERAGE DISPENSING DEVICE

(75) Inventors: Indrani Deo, Ossining, NY (US);
Steven Jersey, Laguna Niguel, CA (US)

(73) Assignee: PepsiCo, Inc., Purchase, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 12/625,226

(22) Filed: Nov. 24, 2009

(65) Prior Publication Data

US 2011/0125334 A1    May 26, 2011

(51) Int. Cl.
*G05D 11/00* (2006.01)
*B67D 1/00* (2006.01)
(52) U.S. Cl. .......................... 700/283; 222/52
(58) Field of Classification Search .................. 700/283; 222/52, 56
See application file for complete search history.

(56) References Cited

U.S. PATENT DOCUMENTS

| | | | |
|---|---|---|---|
| 5,103,649 A | 4/1992 | Kieffer | |
| 5,154,586 A * | 10/1992 | Rudick | 417/415 |
| 6,591,664 B2 * | 7/2003 | Litton | 73/54.41 |
| 2003/0173370 A1 | 9/2003 | Park | |
| 2004/0144423 A1 * | 7/2004 | Everett et al. | 137/98 |
| 2005/0035152 A1 | 2/2005 | Bethuy et al. | |
| 2005/0133420 A1 | 6/2005 | Rinker et al. | |
| 2005/0145650 A1 | 7/2005 | Henry et al. | |
| 2006/0173260 A1 | 8/2006 | Gaoni et al. | |
| 2006/0231109 A1 | 10/2006 | Howell et al. | |
| 2007/0073557 A1 | 3/2007 | Abramson | |
| 2007/0114244 A1 | 5/2007 | Gatipon et al. | |
| 2007/0205220 A1 * | 9/2007 | Rudick et al. | 222/129.4 |
| 2007/0205221 A1 * | 9/2007 | Carpenter et al. | 222/129.4 |
| 2009/0069932 A1 * | 3/2009 | Rudick | 700/239 |

FOREIGN PATENT DOCUMENTS

| | | | |
|---|---|---|---|
| CA | 2492602 A1 | | 7/2006 |
| GB | 2442223 A | * | 4/2008 |
| GB | 2465083 A | | 5/2010 |
| JP | 5120548 A | | 5/1993 |
| JP | 2005276148 A | | 10/2005 |
| JP | 2009245171 A | | 10/2009 |
| WO | 0225608 A1 | | 3/2002 |

OTHER PUBLICATIONS

International Search Report mailed Mar. 15, 2011 from International Application No. PCT/US2010/058072, 4 pages.
International Search Report mailed Mar. 14, 2011 from International Application No. PCT/US2010/058081, 4 pages.
International Search Report mailed Mar. 8, 2011 from International Application No. PCT/US2010/058085, 4 pages.
U.S. Appl. No. 12/703,048 Office Action dated Dec. 21, 2011.

* cited by examiner

*Primary Examiner* — Mohammad Ali
*Assistant Examiner* — Sivalingam Sivanesan
(74) *Attorney, Agent, or Firm* — Banner & Witcoff, Ltd.

(57) ABSTRACT

Systems and methods for dispensing beverages are provided. Aspects relate to obtaining measurements regarding dispensing an ingredient (including the dispensing conditions of the ingredient) and determining whether to adjust dispensing conditions of at least one other ingredient. In one embodiment, at least one ingredient of a recipe is not dispensed based upon a dispensing measurement. The adjustment of one or more ingredients may comprise the use of adjustable orifices, which do not require separate measurements of ingredients before dispensing, but rather may measure ingredients' parameters (including dispensing conditions) as they are dispensed. Certain embodiments relate to devices and methods that may determine if an ingredient is a non-Newtonian fluid, and if so, may be configured to conduct measurements on such fluids, including, for example, the strain stress and strain rate as the fluid passes within a conduit.

21 Claims, 4 Drawing Sheets

BEVERAGE DISPENSING DEVICE

BACKGROUND

Often, at restaurants or other locations such as a consumer's residence, a beverage may be created on-demand from a mixture of ingredients. An advantage of dispensing beverage in this form is that the concentrate containers and water supply typically occupy significant less space than is otherwise required to store the same volume of beverage in individual containers. Moreover, this dispensing equipment likewise eliminates increased waste formed by the empty individual containers.

A typical beverage dispenser may include a pump to force an ingredient, such as a concentrate, to the head. The dispenser may include valves that may attempt to volumetrically measure then dispense certain ingredients. For example, a valve may be selectively opened in response to a consumer requesting a beverage to allow the simultaneous discharge of concentrate and water. The two liquids mix upon discharge and in the container to form the desired beverage. Moreover, some beverages are formed from base components that may be vastly different from the components forming other beverages. Often, these beverages cannot be accurately and efficiently dispensed from a dispenser given the problems with measuring and dispensing ingredients with different properties.

Similarly, in certain implementations, different beverages are formed from concentrates that are only slightly different from each other. For example, customers are often interested in enjoying beverages that, in addition to a base flavor, include a supplemental flavor, such as cherry or lemon-lime. Yet consumers are increasingly interested in adjusting one or more ingredients in their beverages, such as the amount of sugars, often in the form of high fructose corn syrup. Improved systems and methods relating to the dispensing of beverages would be desirable.

SUMMARY OF THE INVENTION

Aspects of this disclosure relate to novel methods for dispensing a composition, such as a beverage. In certain embodiments, one or more novel methods may be conducted with a computer-readable medium having computer-executable instructions that may be executed by a processor to perform the methods. In one embodiment, a determination is made to dispense a recipe having several ingredients. The determination may be based, at least in part, upon a user input. Several parameters of an ingredient (including the dispensing conditions of the ingredient) may be measured as it is being dispensed through a conduit. As used herein, a conduit may be any open area within a passageway that the ingredient may travel within before being discharged from the dispensing system. A conduit may be separated from one or more other conduits by valves, adjustable orifices, or other mechanisms that selectively adjust or prevent the passage of the ingredient. Exemplary measurements that may be conducted as the ingredient traverses a conduit include: flow rate, viscosity, pressure, pH, carbonation and/or temperature.

In certain embodiments, more than one ingredient may be simultaneously dispensed, either into the same conduit or separately into one or more additional conduits. In other embodiments, measurements relating to any ingredient (including the dispensing conditions of the ingredient) may impact the dispensing conditions of at least one or more other ingredients. In one embodiment, at least one ingredient of the recipe is not dispensed based upon one or more of the obtained measurements. In this regard, aspects of the invention also relate to novel devices, which may implement one or more novel methods described herein. In one embodiment, the adjustment of one or more ingredients may comprise the use of adjustable orifices, which do not require separate measurements of ingredients before dispensing, but rather may measure ingredients' parameters (including dispensing conditions) as they are dispensed.

Certain embodiments relate to devices and methods that may determine if an ingredient is a non-Newtonian fluid, and if so, may be configured to conduct measurements on such fluids, including, for example, the strain stress and strain rate as the fluid passes within a conduit.

Certain devices and methods may be implemented to determine if a user input from a remote location is received. In one embodiment, multiple dispensing systems are connected to a communication network, such as the Internet or an intranet. In one embodiment, several dispensing systems may be connected to a central server. In one embodiment, several dispensing systems may be in direct communication with each other. In certain embodiments, a dispensing system may include a beverage dispensing head through which multiple beverage-forming liquids can be discharged. In certain embodiments, a dispensing system may simultaneously discharge a plurality of different ingredients, such as non-carbonated and carbonated water or different blends of flavorings, such as concentrates. In one embodiment, a dispensing system is configured to discharge several different beverages from a single nozzle. In certain embodiments, a dispensing system may supply beverages formed from combinations of one or more different liquids without having to extensively reconfigure the system's internal fluid supply lines and/or electronic circuitry.

DETAILED DESCRIPTION OF THE PREFERRED EMBODIMENT

Figure 1:
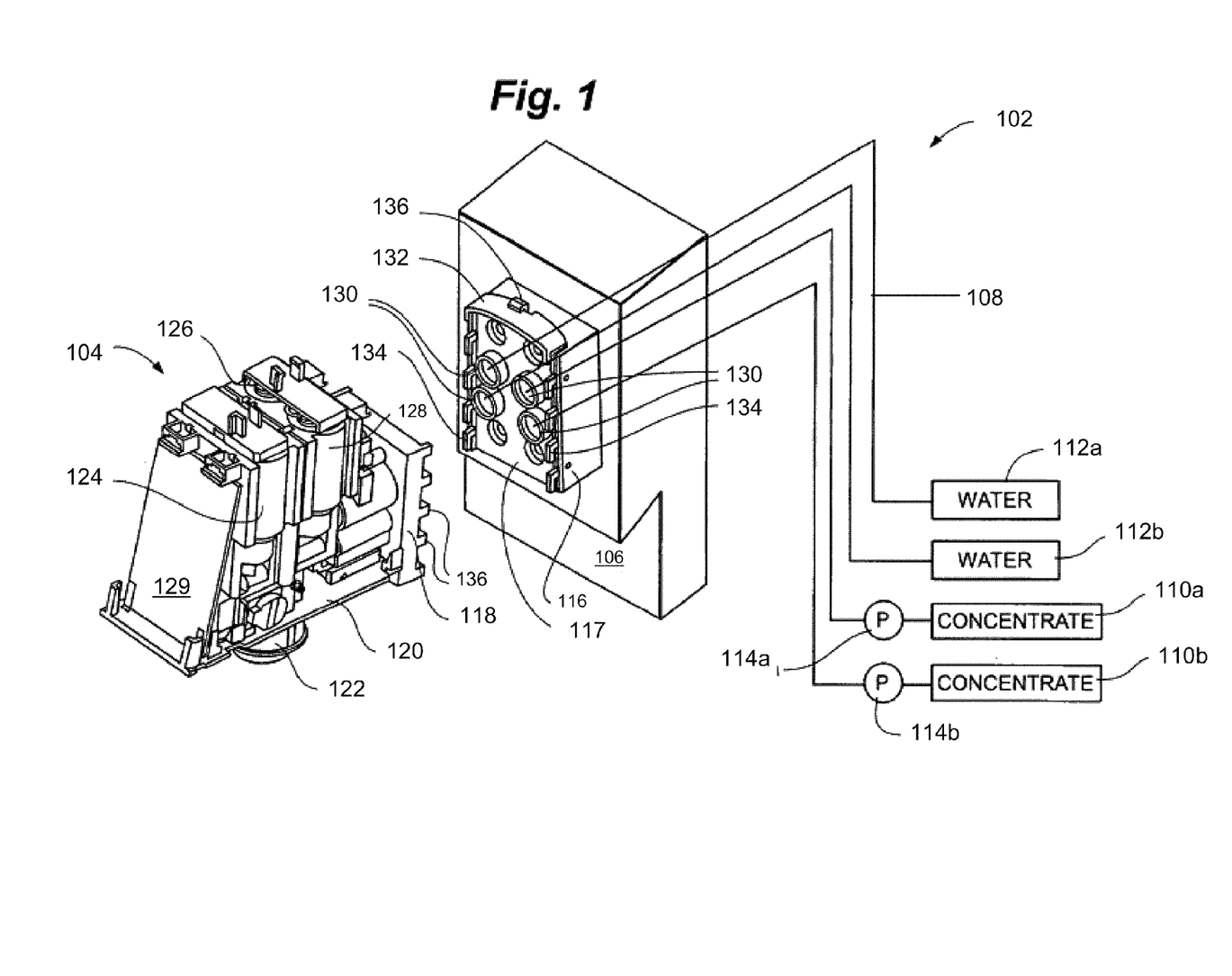
FIG. 1 is an exploded view and schematic diagram of an exemplary dispensing system and dispensing head in accordance with one embodiment of this invention.

FIG. 1 illustrates an exemplary dispensing system 102 that may be configured to dispense a beverage comprising a plurality of ingredients. While the exemplary dispensing system 102 will be described in the context of dispensing a beverage, those skilled in the art will appreciate that other compositions, such as medicaments, lotions, supplements, condiments, may be dispensed according to the teachings of this disclosure. Looking to FIG. 1, the exemplary dispensing system 102 includes a dispensing head 104, and a counter-located base 106, to which the dispensing head 104 may be removably mounted. Reservoirs 110a and 110b may store ingredients configured to be dispensed from dispensing system 102, such as flavored concentrates that may be in different forms, such as liquids (including syrups) or powders. Pumps 114a and 114b may be connected to reservoir 110a and 110b, respectively. The pumps 114a and 114b allow the movement of the associated ingredient through base 106 and into the dispensing head 104. A portion of the ingredients may comprise water (for example, see elements 112*a* and 112*b*). In one embodiment, one water source may supply a noncarbonated water stream. The second source may include a carbonator (not illustrated) that supplies carbon dioxide to the water stream it supplies through base 106 into the dispensing head 104. In another embodiment, the water source may be substantially devoid of carbonation. In yet other embodiments, a plurality of water sources may be configured to provide different levels of carbonated water.

The tubing 108 through which the four illustrated fluid streams flow into the base 106 may terminate at mounting block 116. As seen in FIG. 1, mounting block 116 may be removably mounted to the dispensing head 104. In the illustrative embodiments, mounting block 116 may have a front face 117 comprising passageways 118 to one or more reservoirs for one or more ingredients such as concentrate 110*a*/110*b* and/or water 112*a*/112*b*. The passageways 118 may be integrally formed with and extend from the block front face 116. The front face 116 and/or another portion of the mounting block 116 may further comprise a locking mechanism for aligning and ensuring proper fitting between the passageways 118 and the dispensing head 104.

The illustrated dispensing head 104 includes a vertical back plate 118 from which a base plate 120 extends horizontally. Back plate 118 may be removably coupled to dispensing unit mounting block 116 and a valve body 132 may be seated on the base plate 120. A nozzle assembly 122 is shown to extend below the base plate 120. Valve body 132 may comprise a plurality of conduits through which the ingredients flow into nozzle assembly 122. One or more valve units may be mounted to the valve body 132. For example, valve units 134 and/or 136 may regulate the flow of a separate one of the fluid streams through the dispensing head 104 and out of the nozzle assembly 122.

The dispensing system 102 may comprise one or more computer-readable mediums, such as circuit board 129. Circuit board 129 is shown mounted to the base plate 120 and may comprise the electrical components (not illustrated) that are used to regulate the actuation of pumps 114*a* and 114*b* and/or valve units 134, 136. Circuit board may also comprise computer-readable instructions that when executed by a processor, such as processor (such as processor 206, described in more detail below in relation to FIG. 2) to provide energization signals to valve units 134, 136, control signals to the pumps 114*a* and 114*b*, and/or feedback signals from the dispensing head 104 to the dispensing system 102.

Historically, electronic circuitry 129 (or another component comprising a computer-readable medium, comprised a "flavor chips." The flavor chip comprised computer-executable instructions, that when executed by a processor, would execute a method for mixing a predefined beverage. Unfortunately, past flavor chip technology had to be adapted to the mechanical properties of each dispenser and each flavored beverage required a separate flavor chip. Thus, in certain prior art systems, changing beverages to be dispensed from a dispenser would require the new flavors to be "mapped" onto the chip. For example, each parameter had to be adjusted to ensure the dispensed beverage received the intended proportions of ingredients. Aspects of the invention relate to systems and methods for dispensing custom beverages that do not require the inconvenience of mapping of different flavor chips for each possible combination of the various ingredients.

While FIG. 1 shows one exemplary dispensing system 102, those skilled in the art will readily appreciate that other systems that are either configured or able to be modified to dispense a multi-ingredient beverage according to one or more teachings of this disclosure are within the scope of the invention. Further exemplary systems, including exemplary heads and/or nozzles that may be selectively combined are disclosed in Assignee's U.S. patent application Ser. No. 10/412,681, BEVERAGE FORMING AND DISPENSING SYSTEM, filed Apr. 14, 2003, U.S. Patent Pub. No. 2004/0084475 A1, published May 6, 2004, and/or U.S. patent application Ser. No. 11/118,535, BEVERAGE DISPENSING SYSTEM WITH A HEAD CAPABLE OF DISPENSING PLURAL DIFFERENT BEVERAGES, filed Apr. 29, 2005, U.S. Pat. Pub. No. 2006/0097009, which are incorporated herein by reference in their entirety for any and all purposes.

Figure 2:
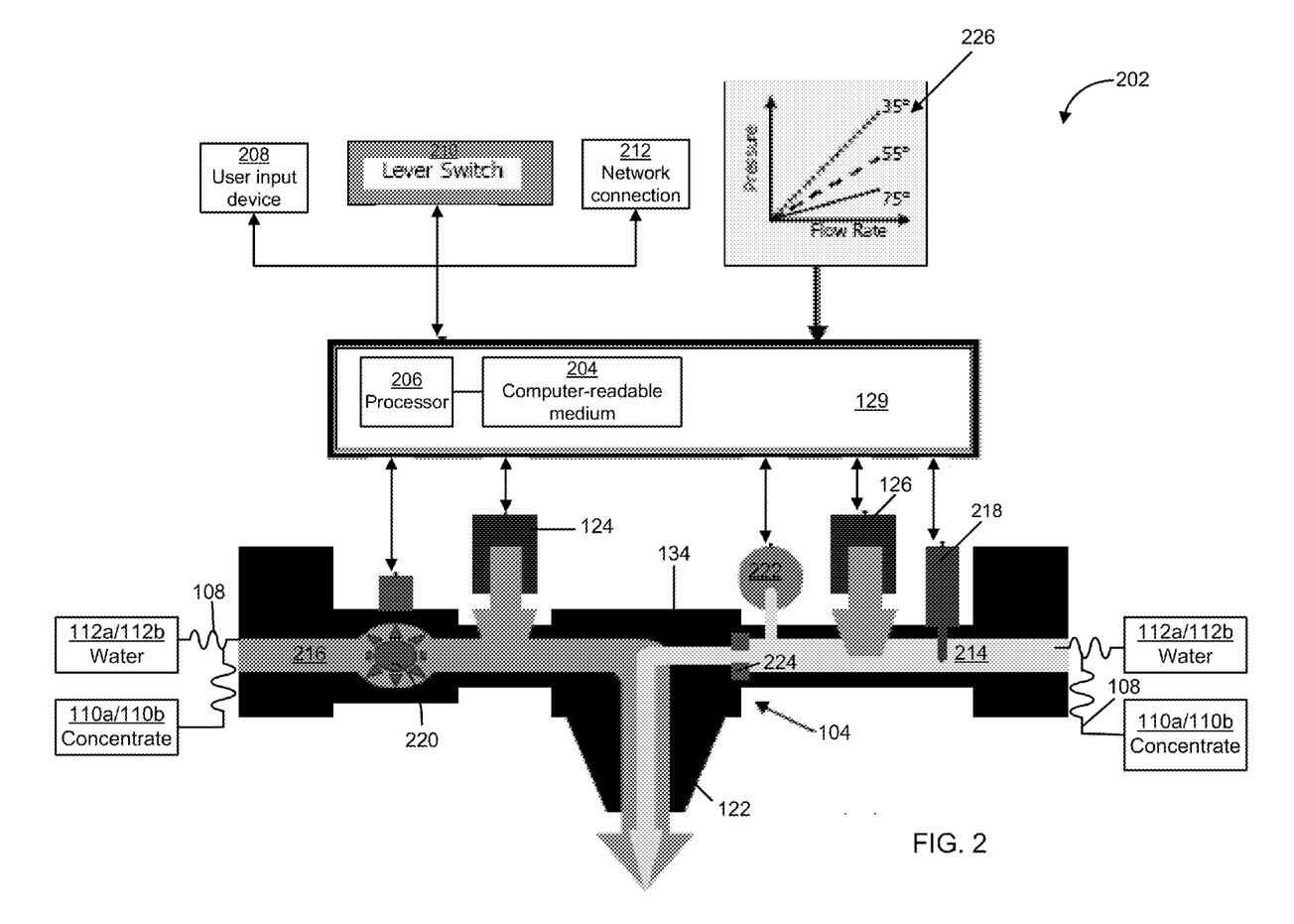
FIG. 2 shows an exemplary embodiment of one dispensing system in accordance with one embodiment of the invention.

FIG. 2 shows an exemplary dispensing system 202 that may be configured for use without prior art flavor chips to dispense custom beverages. Dispensing system 202 may be configured to implement novel methods, such as the methods shown in the flowchart of FIG. 3. In this regard, certain novel features of dispensing system 202 will be described in relation to the methods of FIG. 3, however, the novel apparatus shown in FIG. 2 is not limited to only these methods but are merely provided to demonstrate exemplary uses of dispensing system 202. As seen in FIG. 2, dispensing system 202 comprises an electronic circuitry 129, which may be identical or similar to electronic circuitry 129 shown in FIG. 1. Electronic circuitry 129 comprises a computer-readable medium 204 which may be magnetic, digital, optical, or any format configurable to comprise computer-executable instructions that may be executed by a processor, such as processor 206.

Processor 206 may be configured to execute instructions on the computer-readable medium, such as computer-readable medium 204, received from a user input device 208, lever switch 210 and/or a network connection 212. The user input device 208 may include any components or group of components (including a switch similar or identical to lever switch 210) that allows a user to provide an input to dispensing system 202, which may be mechanical, electrical, or electromechanical. Novel uses of user input device 208 may be implemented in accordance with one or more novel methods described herein. As one example, user input device 208 may be used in conjunction with step 302 shown in FIG. 3. At step 302, instructions may be received for dispensing a beverage. In one embodiment, user input device 208 may allow a user to instruct dispensing system 202 to dispense a specific beverage formula. In one embodiment, user input device 208 may comprise a touch screen that is in operative communication with electronic circuitry 129. The touch screen may be configured to display a plurality of beverage classes. For example, in one embodiment, the classes may include, but are not limited to: colas, diet colas, energy drinks, water, fruit juices and combinations of any of these groups. In certain embodiments, a user may be able to pick a beverage class from a group of classes. In various embodiments, the display of possible beverage for selection may be adjusted based upon the levels or presence of specific ingredients detected in dispensing system 202.

The touch screen may be configured to allow a user to first select a specific brand of beverage, such as a particular energy drink from a plurality of energy drinks. Still yet, the touch screen may allow a user to pick a specific commercially available beverage and further refine the ingredients to be dispensed to form a similar beverage. In one embodiment, the refined beverage has the same ingredients, however, comprises different proportions or amounts of the ingredients. For example, a user may first select the cola beverage "Pepsi," and then wish to adjust one or more parameters of the Pepsi to be dispensed. For example, the user may wish to adjust the sugar content and/or carbonation of the beverage to be dispensed. In another embodiment, the refined beverage has at least one different ingredient, for example; at least a portion of the high fructose corn syrup may be replaced with various levels of one or more ingredients.

While the exemplary embodiment was described in relation to a touch screen, other input devices may be used in combination with or in lieu of a touch screen. For example, a user may swipe a card having electronic information a sensor, such as for example, an optical, magnetic, or RFID sensor to provide a user input. In another embodiment, the user may utilize a biometric input to provide an input. Yet in other embodiments, the user may enter alphanumeric inputs using a keyboard. The lever switch 210 may also be operatively connected to electronic circuitry 129 to provide an input indicative that a receptacle is placed under the nozzle 122.

Network connection 212 may also provide one or more user inputs (as well as transmit outgoing signals) coupling dispensing system 202 to a communication network, such as a LAN or the Internet. The dispensing system 202 (and other devices) may be connected to a communication network via twisted pair wires, coaxial cable, fiber optics or other media. Alternatively, radio waves may be used to connect one or more beverage dispenser systems to the communication network. In one such embodiment, one or more dispensing systems may be in communication with each other and readily transmit and receive information regarding other dispenser systems, including a unique formula dispensed to a particular user. In one embodiment, a plurality of dispensing systems may each be coupled to each other through a central server. Yet in another embodiment, the dispensing systems may communicate directly with each other. Thus, in one or more embodiments, electronic circuitry 129 may include computer-executable instructions for transmitting information to other dispensers and/or a server.

Figure 3:
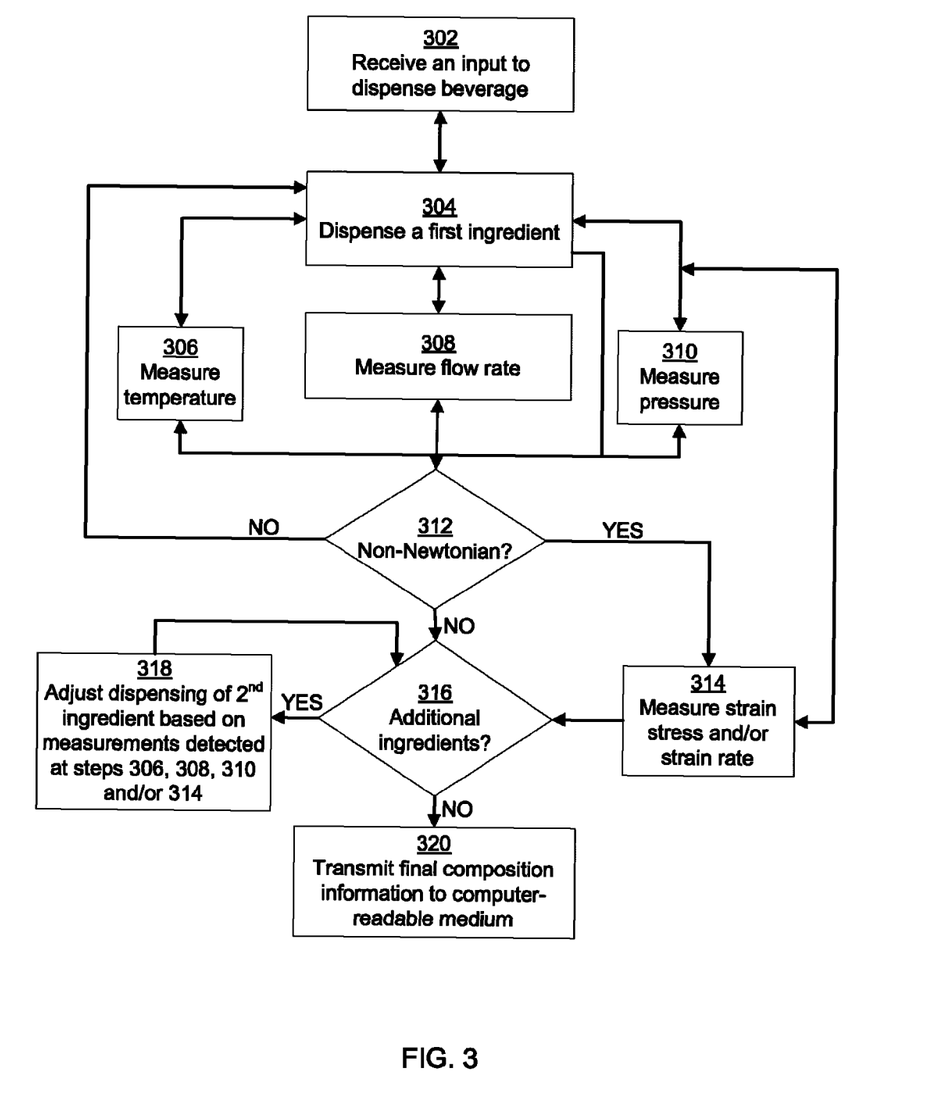
FIG. 3 is a flowchart of an exemplary method in accordance with one embodiment of the invention.

Step 304 of FIG. 3 may be implemented to dispense a first ingredient into a conduit of the dispensing system 202. Looking to the exemplary dispensing system 202 in FIG. 2, a first conduit, such as conduit 214 may also be connected (for example, through a series of valves and/or through tubing 108) to a beverage ingredient source (such, as for example concentrate(s) 110a/110b). During beverage preparation and dispensing, one or more ingredients, such as water 112a/112b and/or concentrates 110a/110b may pass through the first conduit 214. Conduit 214 is merely exemplary, as additional or fewer ingredient sources may be upstream or downstream from conduit 214. Moreover, dispensing system 202 may comprise a plurality of conduits, such as second conduit 216. The second conduit 216 may be in connection with one or more ingredient source, such as water 112a/112b and/or concentrates 110a/110b. In the illustrative dispensing system 202, the first conduit 214 and the second conduit 216 diverge at the nozzle 122, where ingredients may be mixed and dispensed from the dispensing system 202.

Regarding the nozzle 122, the illustrated dispensing system 202 of this invention may include the single dispensing head 104 (shown in FIGS. 1 and 2) with plural passageways, such as conduits 214, 216 (shown in FIG. 2) through which concentrated ingredients may flow. Valve units 124, 126, and 128 may operate independently from each other and be independently controlled. Thus, the disclosed systems 102, 202 may be constructed so that a single dispensing head 104 may be used to discharge beverages blended from any one of two or more distinct ingredients (such as concentrates) to a single nozzle 122. In certain embodiments, this may eliminate the need to provide the system 102 with multiple dispensing heads wherein each head is employed to dispense a single beverage. Other embodiments, however, may implement a plurality or heads and/or nozzles. Regardless of the quantity of nozzles utilized, those skilled in the art will appreciate that valves 124 and 126 may be simultaneously opened to discharge a beverage that is a desirable mixed blend of two or more concentrates or other ingredients.

Dispensing head 104 may be further designed so that the passage of one or more ingredients comprising carbonated water is discharged has a tapered increase in cross-sectional area along its length as measured starting from the top to the bottom. That is, a conduit or passage within dispensing system may be narrow at the high pressure end and widens considerably, to as much as ten times its width at the low pressure end. Consequently, as the water and gas fluid stream flows through a tapered passage, the pressure of the gas bubbles in the stream may decrease continually but gradually. This gradual decrease in pressure reduces the extent the carbon dioxide, upon the discharge an outlet breaks out of the fluid stream. The reduction of carbonation breakout serves to ensure that the blended beverage has sufficient gaseous-state carbon dioxide to impart a desirable taste.

Conduits 214, 216 may comprise a plurality of sensors to measure one or more parameters of one or more ingredients that travel through the respective conduit 214, 216 to the nozzle 122. The measured parameters of a first ingredient may be used to adjust the amount or parameter of a second ingredient to be dispensed. Yet in other embodiments, the measured parameters of the first ingredient may be used to dispense the amount of that ingredient being dispensed. In certain embodiments, several parameters may be measured within conduit 214 and/or conduit 216. In one embodiment, steps 306, 308, and/or 310 may be implemented to measure the temperature, viscosity, pH, flow rate, and/or pressure of a first ingredient in the first conduit. In one embodiment, step 306 may comprise the implementation of temperature sensor 218 (shown in conduit 214), step 308 may include measurements with flow rate sensor 220 (shown in conduit 216) and step 310 may comprise measurements from PSI meter 222 (shown in conduit 214). While, the sensors are shown in two different conduits (214, 216), those skilled in the art will appreciate that both (and additional) conduits may have each of the above-described sensors as well as additional sensors.

Step 312 may also be implemented to determine if the ingredient (or one of the ingredients) is a non-Newtonian fluid. This determination may be based one or more measurements of steps 308-310 and/or based upon known information regarding the ingredient. For example, an electronic signal may be transmitted from the electronic circuitry 129 that is indicative that the ingredient(s) in at least one conduit 214, 216 is/are non-Newtonian. If at step 312, it is determined that the ingredient is non-Newtonian, step 314 may be implemented. At step 314, one or more sensors may detect or otherwise measure the shear stress and/or strain rate of the ingredient(s). In one embodiment, a first sensor in a first conduit 214 may be used to detect the flow rate of a first fluid; however, a second sensor in the same first conduct 214 may be used to detect the flow rate of a second fluid.

In those embodiments, where the ingredient is non-Newtonian, the shear stress could utilize sensors to first measure the gradient of for example, by using a first sensor to measure the gradient of the velocity profile at the walls of the conduit 214, 216. Computer-executable instructions on computer-readable medium 204 may use processor 206 to multiply the signal from the first sensor by the dynamic viscosity to provide the shear stress of that particular ingredient or combination of ingredients. In one embodiment, one or more micro-pillar shear-stress sensors may be used in conduit(s) 214, 216. The micro-pillar structures may be configured to flex in response to the drag forces in close proximity to the outer perimeter of the conduit(s) 214, 216 (i.e., the walls). The flexing may be detected electronically, mechanically, or optically. The result of the flexing may be received as an electronic signal by computer-executable instructions on computer-readable medium 204. Processor 206 may utilize the received electronic signal to determine wall-shear stress. As discussed above, one or more of the conduits 214, 216 may comprise a temperature sensor 218, which may transmit electronic signals as an input to electronic circuitry 129. The input from temperature sensor 218 may also be used in conjunction with one or more other sensors to determine the viscosity of an ingredient of composition comprising a plurality of ingredients.

Further aspects of the invention relate to novel uses of adjustable orifices. For example, in certain embodiments, rather than implement the volumetric measurement then dispensing of ingredients, adjustable orifices may be used to simultaneously measure and dispense ingredients. For example, as an ingredient (or compositions having a plurality of ingredients) flows through a conduit, flow meter 220 and temperature meter 218 may determine the viscosity of the ingredient. Based upon the parameters detected by meters 218 and 220, information may be received from the electronic circuitry 129 that adjusts, rather than merely opening or closing, an orifice (see, e.g., elements 126 and 224 within conduit 214 within the conduit 214, 216). In certain embodiments, this may result in a more homogeneous combination of the ingredients. In other embodiments, it may result in less wear and tear on the dispensing device 202. In yet further embodiments, it may result in more efficient measurements of ingredients. Obtaining accurate measurements of ingredients may be of special importance, for example, when dealing with micro-nutrients, such as nutrients that comprise less than about 5% of the entire beverage or composition. In certain embodiments, a first ingredient may be dispensed from dispensing system 202 or at about 6% of the final beverage.

In one embodiment, the flow rate of at least one ingredient may be adjusted by the same mechanism that measures the flow rate. For example, exemplary flow rate sensor 220 (shown in conduit 216 of FIG. 2) may comprise a turbine or a paddle meter that is configured to measure the flow rate of an ingredient within conduit 216 (this measurement may be conducted in cooperation with information received from one or more other sensors within dispensing device 202). Based upon the determination of the flow rate, electronic circuitry 129 may transmit a signal that causes a drag placed upon at least a portion of sensor 220 (such as a turbine or paddle portion) thus acting as a restrictive orifice, such that the quantity of ingredient that is dispensed through conduit over a predetermined period of time is reduced. Likewise, electronic circuitry 129 may transmit a signal that causes less drag placed upon at least a portion of sensor 220, (i.e., at least a turbine or paddle), thus acting to increase the quantity of ingredient that is dispensed through conduit over a predetermined period of time is reduced. This may occur during or before step 316, in which it is determined whether further ingredients are to be dispensed. In further embodiments, one or more parameters of any ingredient being dispensed may be adjusted based upon information received from one or more sensors (such as sensors 218 and/220). For example, the carbonation levels of the ingredient may be altered to adjust the viscosity of the ingredient being dispensed.

Further, in the preparation of certain compositions to be dispensed, it may not be desirable to dispense a first ingredient under the same pressure as a second ingredient (for example, when dispensing a second ingredient at step 318). In some instances, it may be desirable to reduce the pressure under which a first ingredient is dispensed, in yet other embodiments; it may desirable to increase the pressure that an ingredient is dispensed, for example, to ensure proper mixing or the intended profile of the beverage. In certain embodiments, adjustable orifices may be implemented to ensure the optimal flow rate is implemented for certain ingredients. For example, computer-readable instructions may be used to achieve the optimal combination of pressure and flow rate of an ingredient passing through a conduit 214, 216, such as by use of an adjustable orifice. A simplified graphical illustration is shown by way of element 226. As seen by element 226, adjusting an input, such as through a step motor (for example "35°", "55°", or "75°") may be used to obtain a preferred combination of flow rate and pressure. Those skilled in the art will readily appreciate that element 26 is merely illustrative and that other implementations, including the use of more than three adjustable settings, are within the scope of this disclosure.

At step 320, information regarding the dispensed beverage or composition may be stored on a computer-readable medium, such as computer-readable medium 204. The computer-readable medium of step 320 is not, however, required to be within or local to the dispensing system 202. Instead, the information regarding the dispensed beverage may be transmitted through network connection 212 to a remote computer-readable medium. In one embodiment, the unique composition dispensed through the implementation of one or more methods shown in FIG. 3 may be received at a second dispensing system, which may dispense the substantially the same beverage or composition.

Figure 4:
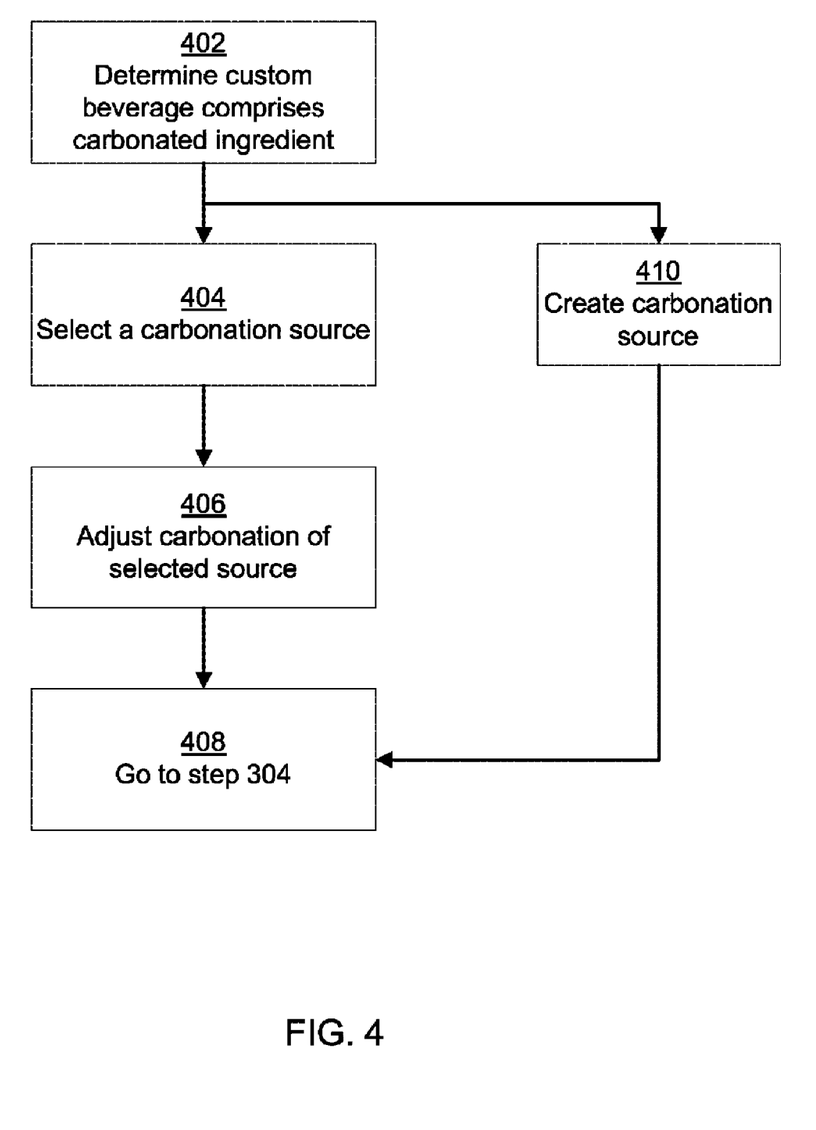
FIG. 4 is a flowchart of an exemplary method in accordance with one embodiment of the invention.

FIG. 4 shows a flowchart of an exemplary method in accordance with one embodiment of the invention. At step 402, it may be determined whether a custom beverage comprises a carbonated ingredient, such as carbonated water. In one embodiment, steps 404 and/or 406 may be performed to select a carbonation source (step 404) and adjust the carbonation of the selected source (step 406). For example, at step 404, it may be determined that the beverage requested contained carbonated water, however, the user requested that the beverage comprise less high fructose corn syrup, therefore the carbonation levels of the beverage may be reduced. Commonly assigned pending U.S. patent application Ser. Nos. 12/703,048 and 12/703,003, which are incorporated herein fully by reference in their entirety, disclose systems and methods relating to the creation and dispensing of novel beverage compositions. In one embodiment, the level of carbonation (or any gas) of a second ingredient is adjusted based upon electronic signals received from one or more signals regarding measurements from sensors measuring parameters of a first ingredient. Such parameters may be the flow rate, viscosity, pH, pressure, level of carbonation, level of constituents, such as sugar, water, coloring, etc., and/or any combination of these and other parameters that relate to the first ingredient.

In certain embodiments, the carbonation source selected in 404 may be one of a plurality of sources. For example, different sources may comprise various levels of carbonation; therefore, one source comprising the closest amount of carbonation needed may be selected before adjustment. In certain embodiments, dispensing system 102, 202 may selectively discharge streams of carbonized and non-carbonized water from separate containers, for example, reservoirs 112*a*-112*b*. Therefore, in certain implementations, the dispensing head 104 can be employed to dispense beverages selectively made from either carbonized or non-carbonized water. Alternatively, the dispensing head 104 may be used to dispense a beverage comprising carbonated water and non-carbonated water. In one embodiment, adjustable orifices are opened simultaneously to cause the simultaneous dispensing of both carbonated and non-carbonated water. This is useful when it is desired to blend these two liquids with a concentrate to produce a lightly carbonated beverage. In one embodiment, by varying the amount of time each orifice is open at one or more predetermined diameters, the extent to which the water supplied for the beverage may be set anywhere between fully carbonated (100% carbonated water supply) to no carbonation (100% non-carbonated water supply).

In yet other embodiments, step 410 may be used to create a carbonation source. In one embodiment, a first conduit such as conduit 214 may comprise water and conduit 216 may comprise carbon dioxide gas. Thus, based upon the sensors 218, 220, 222, and/or other sensors within conduits 214, 216 or elsewhere within dispensing system 202, the amount of water that is combined with the carbon dioxide gas is determined and dispensed, such as through an adjustable orifice. Regardless of whether steps 404 and 406 or step 410 is implemented, step 408 may be initiated. In one embodiment, the resultant carbonated ingredient may be dispensed into a conduit, such as conduits 214 and/or 216. (see, e.g., step 304 of FIG. 3).

It should further be appreciated that not embodiments have all of the above-described features and/or include each step and/or process of the disclosed methods. For example, certain embodiments may be provided with different quantities of fluid passageways and valve units than have been described above with respect to the illustrated embodiments. It is anticipated that these alternative embodiments of the invention may be used to provide a means for forming a beverage from a combination of a plurality of ingredients, which may be discharged from a either a plurality of nozzles or, alternatively, a single nozzle. Moreover, one or more nozzles may be configured to provide a discharge passage that extends vertically downward. Yet in other embodiments, one or more discharge passages for ingredients may have a spiral or helical configuration. While the exemplary dispensing system 102 shown in FIG. 1 may be used in a commercial setting, for example, a restaurant, those skilled in the art will readily appreciate that the teachings of this disclosure may be applied to any dispensing system, such as implemented in bar gun technology and/or residential use. Further, embodiments within the scope of this disclosure may be used with frozen beverages and/or non-carbonated beverages.

We claim:

1. A computer-readable medium comprising computer-executable instructions that when executed by a processor are configured to execute a method comprising:
    based on an input, determining to dispense a first recipe comprising an estimated amount of at least a first ingredient and a second ingredient;
    initiate dispensing the first ingredient of the beverage through a first conduit;
    measuring a plurality of parameters of the first ingredient being dispensed through the first conduit to obtain a result for each parameter;
    based upon the result of at least one measured parameter of the first ingredient, adjusting the estimated amount of the second ingredient to be dispensed into either the first conduit or a second conduit;
    initiate dispensing the second ingredient of the beverage into either the first conduit or the second conduit;
    measuring a plurality of parameters of the second ingredient being dispensed through the first conduit to obtain a result for each parameter;
    based upon the result of at least one measured parameter of the second ingredient, adjusting an amount of a third ingredient to be dispensed into either the first conduit, the second conduit, or a third conduit;
    and initiate dispensing the third ingredient of the beverage into either the first conduit, the second conduit, or the third conduit.

2. The computer-readable medium of claim 1, wherein the adjustment of the second ingredient comprises the prevention of dispensing any amount of the second ingredient.

3. The computer-readable medium of claim 2, the instructions further comprising:
    dispensing a third ingredient through either the first conduit or a second conduit, wherein the third ingredient is not present in the first recipe.

4. The computer-readable medium of claim 1, the instructions further comprising:
    measuring parameters of the second ingredient as it is dispensed; and
    based upon the measured parameters of the second ingredient, adjusting the amount of a third ingredient to be dispensed into either the first conduit or a second conduit.

5. The computer-readable medium of claim 1, wherein the adjustment of at least one ingredient comprises adjusting an adjustable orifice.

6. The computer-readable medium of claim 1, the instructions further comprising:
    determining that at least one of the first ingredient or the second ingredient is a non-Newtonian fluid, and
    for the non-Newtonian fluid, detecting a measurement selected from the group consisting of: strain stress, strain rate, and combinations thereof as the non-Newtonian fluid is dispensed into a conduit.

7. The computer-readable medium of claim 1, wherein the measured parameters of the first ingredient are selected from the group consisting of: flow rate, viscosity, pressure, pH, temperature, and combinations thereof.

8. The computer-readable medium of claim 1, wherein the input to initiate dispensing a beverage comprises electrical, mechanical or electromechanical inputs.

9. The computer-readable medium of claim 8, wherein the input to initiate dispensing a beverage comprises an electrical input that is received through a communication interface connected to a remote computer device.

10. An apparatus comprising:
    a first conduit selectively connected to a first ingredient source, the first conduit comprising a plurality of sensors configured to measure parameters of at least one ingredient;
    a user input device configured to transmit an input directing the discharge of a recipe from the apparatus;
    a computer-readable medium comprising computer-executable instructions that when executed by a processor are configured to execute a method comprising:
        based on the input from the user input device, determining to dispense a first recipe comprising an estimated amount of at least the first ingredient and a second ingredient;
        initiating dispensing the first ingredient of the beverage through the first conduit;
        utilizing the sensors to measure a plurality of parameters relating to the first ingredient being dispensed through the first conduit to obtain a result for each parameter;
        based upon the result of at least one measured parameter of the first ingredient, adjusting the estimated amount of the second ingredient to be subsequently dispensed into either the first conduit or a second conduit comprising a plurality of sensors configured to measure parameters of the second ingredient;

utilizing the sensors to measure a plurality of parameters relating to the second ingredient being dispensed through the first conduit or the second conduit to obtain a result for each parameter; and based upon the result of at least one measured parameter of the second ingredient, adjusting an amount of a third ingredient to be subsequently dispensed into either the first conduit, the second conduit, or a third conduit.

11. The apparatus of claim 10, wherein the adjustment of amount of the second ingredient comprises the prevention of dispensing any amount of the second ingredient.

12. The apparatus of claim 11, the computer-executable instructions further comprising:

dispensing a third ingredient through either the first conduit or the second conduit, wherein the third ingredient is not present in the recipe.

13. The apparatus of claim 12, the computer-executable instructions further comprising:

measuring parameters of the second ingredient as it is dispensed into either the first or second conduit; and based upon the measured parameters of the second ingredient, adjusting the amount of a third ingredient to be dispensed into either the first conduit or a second conduit.

14. The apparatus of claim 10, further comprising an adjustable orifice that is configured to adjust the amount that at least one ingredient dispensed into a conduit.

15. The apparatus of claim 10, wherein the computer-executable instructions further comprise:

determining that at least one of the first ingredient or the second ingredient is a non-Newtonian fluid, and for the non-Newtonian fluid, detecting a measurement selected from the group consisting of: strain stress, strain rate, and combinations thereof as the non-Newtonian fluid is dispensed into a conduit.

16. The apparatus of claim 10, wherein one or more of the sensors of the first conduit are configured to measure parameters of the first ingredient selected from the group consisting of: flow rate, viscosity, pressure and temperature, and combinations thereof.

17. The apparatus of claim 10, wherein the user input device comprises a communication interface that is configured to communicate with a remote computer device.

18. The apparatus of claim 10, further comprising a nozzle in communication with the first conduit and the second conduit and configured to combine several different ingredients of a recipe.

19. A computer-implemented method comprising:

based on an input, determining to dispense a first recipe comprising an estimated amount of at least a first ingredient and a second ingredient;

initiate dispensing the first ingredient of the beverage through a first conduit;

measuring a plurality of parameters of the first ingredient being dispensed through the first conduit to obtain a result for each parameter, wherein the measured parameters are selected from the group consisting of: flow rate, viscosity, pressure, pH, temperature, and combinations thereof;

based upon the result of at least one measured parameter of the first ingredient, adjusting the estimated amount of the second ingredient to be subsequently dispensed into a second conduit;

initiate dispensing of the second ingredient of the beverage through the second conduit;

measuring parameters of the second ingredient as it is dispensed;

based upon the measured parameters of the second ingredient, adjusting the estimated amount of a third ingredient to be dispensed into either the first conduit or the second conduit; and initiate dispensing of the third ingredient of the beverage through either the first conduit or the second conduit.

20. The computer implemented method of claim 19, wherein the adjustment of at least one ingredient comprises adjusting an adjustable orifice.

21. The computer implemented method of claim 20, the instructions further comprising:

determining that at least one of the first ingredient or the second ingredient is a non-Newtonian fluid, and for the non-Newtonian fluid, detecting a measurement selected from the group consisting of: strain stress, strain rate, and combinations thereof as the non-Newtonian fluid is dispensed into a conduit.

* * * * *